May 30, 1967 J. GALLO 3,321,866
STEPHANOTIS FLOWER HOLDER
Filed Oct. 22, 1965

3,321,866
STEPHANOTIS FLOWER HOLDER
Joseph Gallo, 938 East St., Walpole, Mass. 02081
Filed Oct. 22, 1965, Ser. No. 500,857
1 Claim. (Cl. 47—55)

ABSTRACT OF THE DISCLOSURE

The disclosure of the present invention comprises a stephanotis flower holder for supporting and for supplying moisture to a stephanotis flower comprising the corolla having a corolla tube limbed with petals at its outer end and having the base apertured to receive the stephanotis flower holder, said stephanotis flower holder comprising a supporting stem, and a cylindrical corolla tube entering element comprising a water absorbent cylindrical cotton wrapping on said stem having an external diameter substantially 3/16″ about equal to the internal wall diameter of said corolla tube, and a length substantially one inch about equal to the length of said corolla tube and a base portion of said cotton wrapping of larger diameter providing a supporting shoulder for the base of said tube, a water resistant covering enclosing the base portion of said wrapping, a wax cover overlying the outer end of said cotton wrapping providing an outer water seal for said cotton wrapping.

---

The present invention relates to a flower holder, and more particularly to an artificial stem for the flower of a stephanotis plant.

The stephanotis flower because of its delicacy and charm is much in demand for floral decorations. Both flower and stem, however, are fragile and require a constant supply of water without which the plant rapidly withers away. To the present time, no satisfactory way has been found of supporting or of supplying moisture to the stephanotis flower for use in corsages, bouquets and similar portable floral items.

It is a principal object of the invention to provide a novel floral holder which is especially adapted to hold and to preserve the stephanotis flower for an extended period for use in portable floral arrangements which will include corsages, bouquets and the like.

With the above and other objects in view, the several features of the invention will be readily appreciated by one skilled in the art from the following description taken in connection with the accompanying drawing in which.

Figure 1:
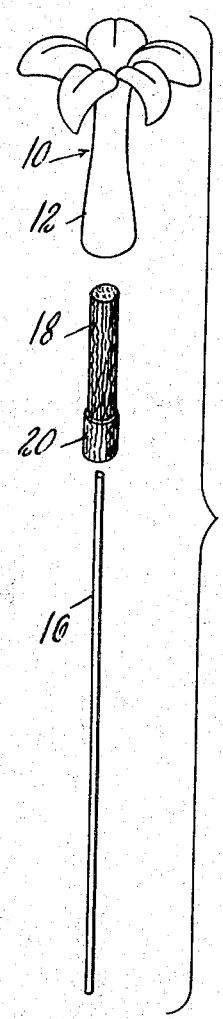
FIG. 1 is an exploded perspective view of a stephanotis flower and portions of an artificial stem assembled therewith, the outer wrapping for the stem having been omitted.
Figure 2:
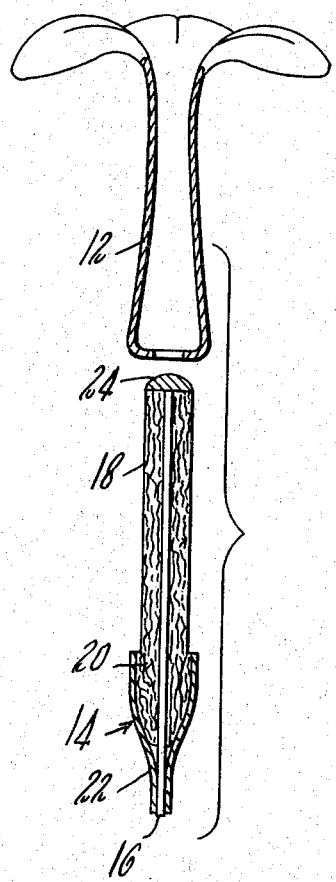
FIG. 2 is a sectional view of the upper portion of the artificial stem, and of a stephanotis flower with the base cut away to be fitted onto the holder.

The stephanotis plant is a tropical woody vine with fragrant white flowers which grow in clusters on short pulpy stems. The corolla or petal portion of the flower which appears to be attached directly to the stem has a cylindrical dilated tube and spreading limbs or petals.

In accordance with the invention, an artificial stem is provided which is adapted for mounting thereon the stephanotis flower or corolla detached from the natural stem, and for supplying moisture to the corolla in a manner and in sufficient quantity to maintain the flower in a fresh, unwilted condition for an extended period of time.

Referring to the drawing, the corolla or petal portion 10 of a stephanotis flower is illustrated; the attached stem having been cut away leaving the cylindrical dilated tube portion 12 thereof open at the bottom.

The artificial stem 14 on which the stephanotis flower, prepared in the manner indicated, is mounted comprises a wire stem 16 having the upper end thereof enclosed within a cylindrical wrapping 18 of water absorbent cotton. The flower end of the wrapping 18 is formed with an enlarged portion 20 providing a shoulder against which the tubular portion 12 of the flower is seated. The wrapping 18 is approximately 3/16″ in diameter and is preferably one inch in length from the enlarged shoulder portion 20 to the wax cover or tip 24, providing a continuous contact of the wrapping 18 with the inner wall of the tube portion 12 of the flower along the entire length thereof. The enlarged portion of the cotton wrapping and the exposed portions of the wire stem are wrapped with a suitable covering 22 which may be a water resistant or waterproofed tape of any well known type. The upper end of the cotton wrapping 18 is sealed in by a wax cap 24.

The stephanotis flower is assembled with the artificial stem or holder 14 in the following manner:

The stephanotis flower or corolla is removed from the stem portion of the plant leaving an aperture 26 in the bottom end of the tube 12.

Figure 3:
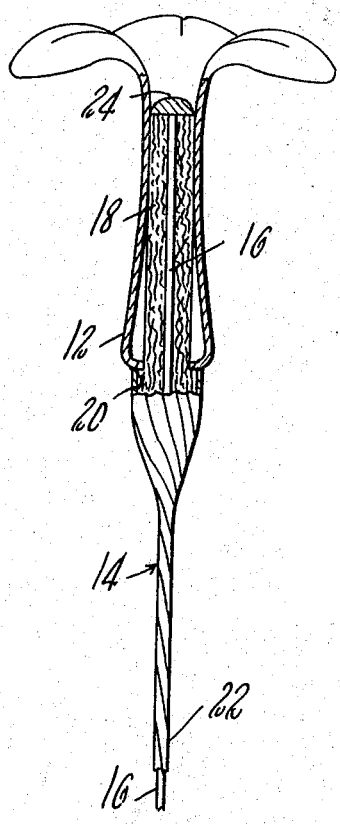
FIG. 3 is a view partly in section of the flower holder assembled with a stephanotis flower.

The cotton wrapping 18 is thoroughly impregnated with water, and is then thrust upwardly through the aperture 26 into the tube portion 12 of the stephanotis flower until the bottom of the tube is seated against the shouldered lower end 20 of the holder 14. The stephanotis flower and the artificial stem or holder 14 are shown in assembled position in FIG. 3.

The assembly operation may be varied if desired by inserting the moistened wrapped portion 18 of the holder into the tubular portion 12 of the flower without the wax tip 24. A small amount of wax is then dropped onto the upper end of the holder 14, through the upper end of the flower to effect the seal.

The artificial stem or holder above described provides a most effective support for the stephanotis flower, in that a sturdy support is provided for the tubular portion of the corolla along its entire length, said support, however, being entirely concealed within the flower. The cylindrical cotton wrapping 18 provides a means for continuously supplying moisture to the engaged inner wall of the tube portion 12 of the corolla from which water is most effectively distributed to all portions of the flower.

The wax seal 24 has been found essential to seal in the supply of water to prevent loss by evaporation, and thus to ensure a maximum useful life of the so mounted stephanotis flower.

The invention having been described what is claimed is:

A stephanotis flower holder for supporting and for supplying moisture to a stephanotis flower comprising the corolla having a corolla tube limbed with petals at its outer end and having the base apertured to receive the stephanotis flower holder, said stephanotis flower holder comprising a supporting stem, and a cylindrical corolla tube entering element comprising a water-absorbent cylindrical cotton wrapping on said stem having an external diameter of substantially 3/16" about equal to the internal wall diameter of the corolla tube, a length of substantially one inch, about equal to the length of the corolla tube, and a base portion of said cotton wrapping of larger diameter providing a supporting shoulder for the base of said corolla tube, a water sealing closure for said water absorbent tube entering element abutting the base end of the supported corolla tube, and a water sealing wax cover overlying the outer end of said water absorbent tube entering element and integral therewith closing the outer end of said corolla tube.

References Cited

UNITED STATES PATENTS

| | | | |
|---|---|---|---|
| 2,331,440 | 10/1943 | Thomas | 47—55 |
| 3,150,462 | 9/1964 | Gallo | 47—55 |

ABRAHAM G. STONE, *Primary Examiner.*

R. E. BAGWILL, *Assistant Examiner.*